(12) United States Patent  (10) Patent No.: US 8,800,963 B2
Huang  (45) Date of Patent: Aug. 12, 2014

(54) DISCHARGE VALVE ASSEMBLY

(71) Applicant: Ya Horng Electronic Co., Ltd., Tainan (TW)

(72) Inventor: Jin-Yi Huang, Tainan (TW)

(73) Assignee: Ya Horng Electronic Co., Ltd., Tainan (TW)

( * ) Notice: Subject to any disclaimer, the term of this patent is extended or adjusted under 35 U.S.C. 154(b) by 0 days.

(21) Appl. No.: 13/765,189

(22) Filed: Feb. 12, 2013

(65) Prior Publication Data

US 2013/0277593 A1 Oct. 24, 2013

(30) Foreign Application Priority Data

Apr. 18, 2012 (TW) .............................. 101207184 A

(51) Int. Cl.
F16K 31/44 (2006.01)
F16K 5/08 (2006.01)

(52) U.S. Cl.
CPC ........................................ F16K 5/08 (2013.01)
USPC ........... 251/221; 251/225; 251/267; 251/273; 251/274; 137/454.5; 137/454.6

(58) Field of Classification Search
USPC .............. 251/318–319, 149.4, 221, 225, 264, 251/266–267, 273–274; 137/454.5–454.6
See application file for complete search history.

(56) References Cited

U.S. PATENT DOCUMENTS 3,298,389 A * 1/1967 Freeman .................... 137/454.6

FOREIGN PATENT DOCUMENTS

TW M255707 1/2005

* cited by examiner

Primary Examiner — John K Fristoe, Jr.
Assistant Examiner — Marina Tietjen
(74) Attorney, Agent, or Firm — Hamre, Schumann, Mueller & Larson, P.C.

(57) ABSTRACT

A discharge valve assembly includes: a valve casing that has an intake bore, an air chamber communicating with the intake bore, and a discharge aperture communicating with the air chamber; a metal intermediate ring disposed in the air chamber and having a valve hole that communicates with the air chamber, and at least one connecting aperture that communicates with the discharge aperture and the valve hole; a base ring that retains the metal intermediate ring in the air chamber and is mounted on the valve casing; and an adjuster that is disposed in the base ring and movable relative to the base ring to adjust an air flow through the valve hole.

3 Claims, 4 Drawing Sheets

DISCHARGE VALVE ASSEMBLY

CROSS-REFERENCE TO RELATED APPLICATION

This application claims priority of Taiwanese Application No. 101207184, filed on Apr. 18, 2012, the disclosure of which is incorporated herein by reference.

BACKGROUND OF THE INVENTION

1. Field of the Invention

The invention relates to a valve assembly, more particularly to a discharge valve assembly having a metal intermediate ring formed with a valve hole so as to slowly and steadily discharge an air flow.

2. Description of the Related Art

For a variety of instruments that require slow and steady release of air pressure, such as a sphygmomanometer used for measuring blood pressure, a crucial factor to determine whether a measured value of blood pressure is accurate or not is the air discharge stability of a discharge valve assembly included in the sphygmomanometer. Referring to FIG. 1, a conventional discharge valve assembly disclosed in Taiwanese Utility Model No. M255707 includes a valve body 11, an elastic silicone air receptacle 12 that is inserted into the valve body 11 and that has a peripheral surface formed with a hole 120 that communicates with an inner side of the valve body 11, and an adjusting rod 13 that is inserted into the air receptacle 12. The adjusting rod 13 is movable relative to the air receptacle 12 so as to deform the air receptacle 12 to control an opening size of the hole 120, thereby adjusting the flow rate of air discharged therefrom.

For adjusting the flow rate of the discharged air based on the deformation adjustment of the hole 120 of the air receptacle 12, this kind of structural design has drawbacks related to an unstable flow rate of the discharged air due to elastic fatigue of the air receptacle 12 or difficulty in accurately and stably controlling the opening size of the hole 120 attributed to storage and/or transport temperature.

SUMMARY OF THE INVENTION

Therefore, an object of the present invention is to provide a valve assembly that can alleviate the aforesaid drawback of the prior art and permit stable adjustment of an air flow.

According to the present invention, a discharge valve assembly includes a valve casing, a metal intermediate ring, a base ring, and an adjuster. The valve casing has an intake bore that extends in a front-rear direction and along an axis of the valve casing and that opens frontward, an air chamber communicating coaxially with the intake bore, and a discharge aperture that extends radially and communicates with the air chamber.

The metal intermediate ring is disposed coaxially in the air chamber and has a valve hole that extends axially and communicates with the air chamber, and at least one connecting aperture that extends radially and communicates with the discharge aperture and the valve hole.

The bass ring retains the metal intermediate ring in the air chamber, and is coaxially mounted on the valve casing.

The adjuster is disposed coaxially in the base ring, extends frontward to be inserted into the valve hole, and is movable relative to the bass ring to adjust an air flow through the valve hole.

The effect of the present invention resides in that, through adjustment of the adjuster movable relative to the base ring, the air flow is controllable to be precisely and stably discharged through a structural design of the valve hole of the metal intermediate ring.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
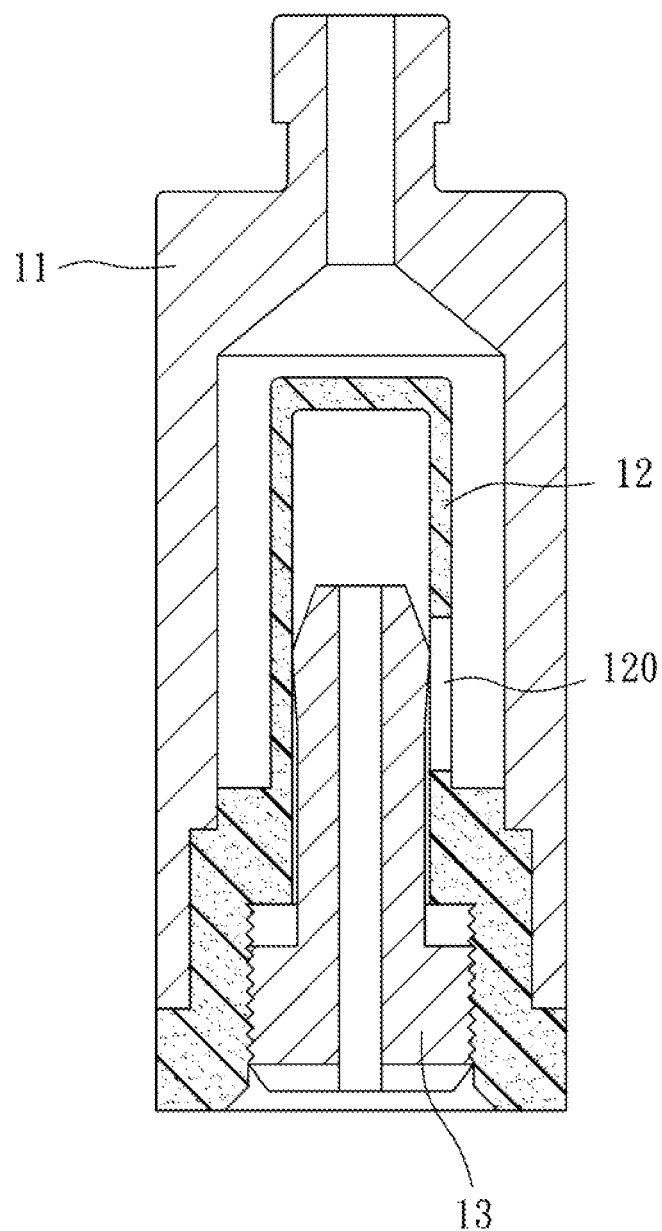
FIG. 1 is a sectional view of a conventional discharge valve assembly.
Figure 2:
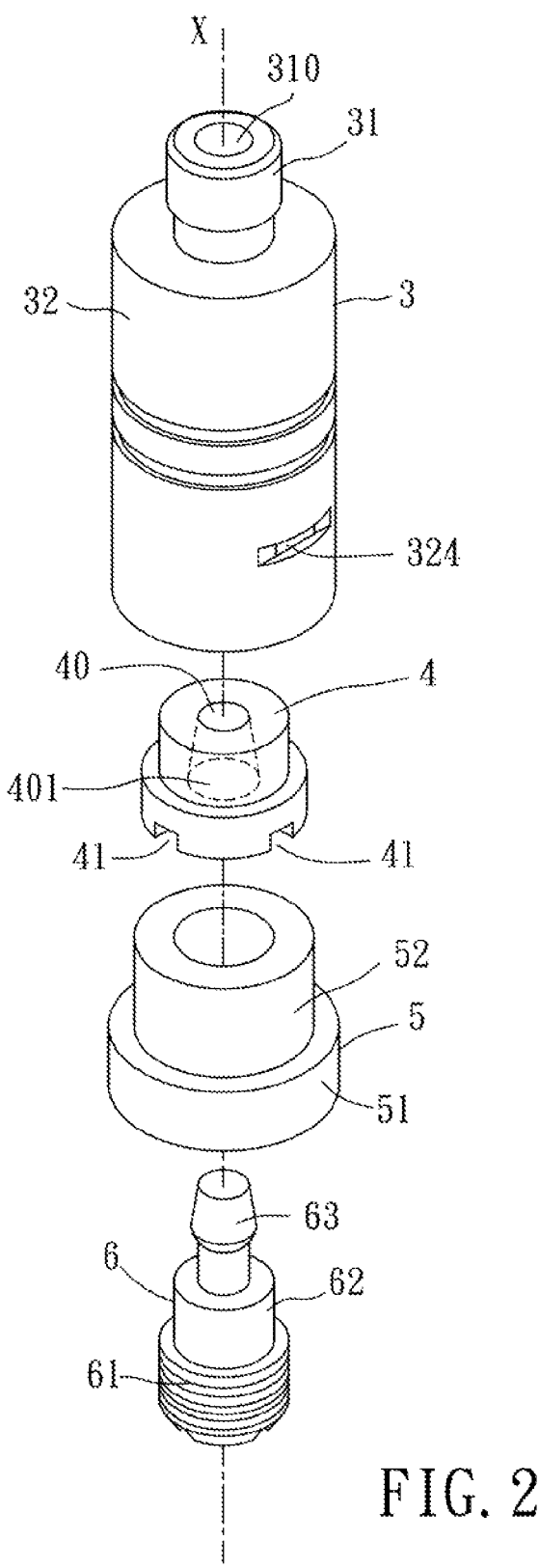
FIG. 2 is an exploded perspective view showing the preferred embodiment of a discharge valve assembly according to the present invention.
Figure 3:
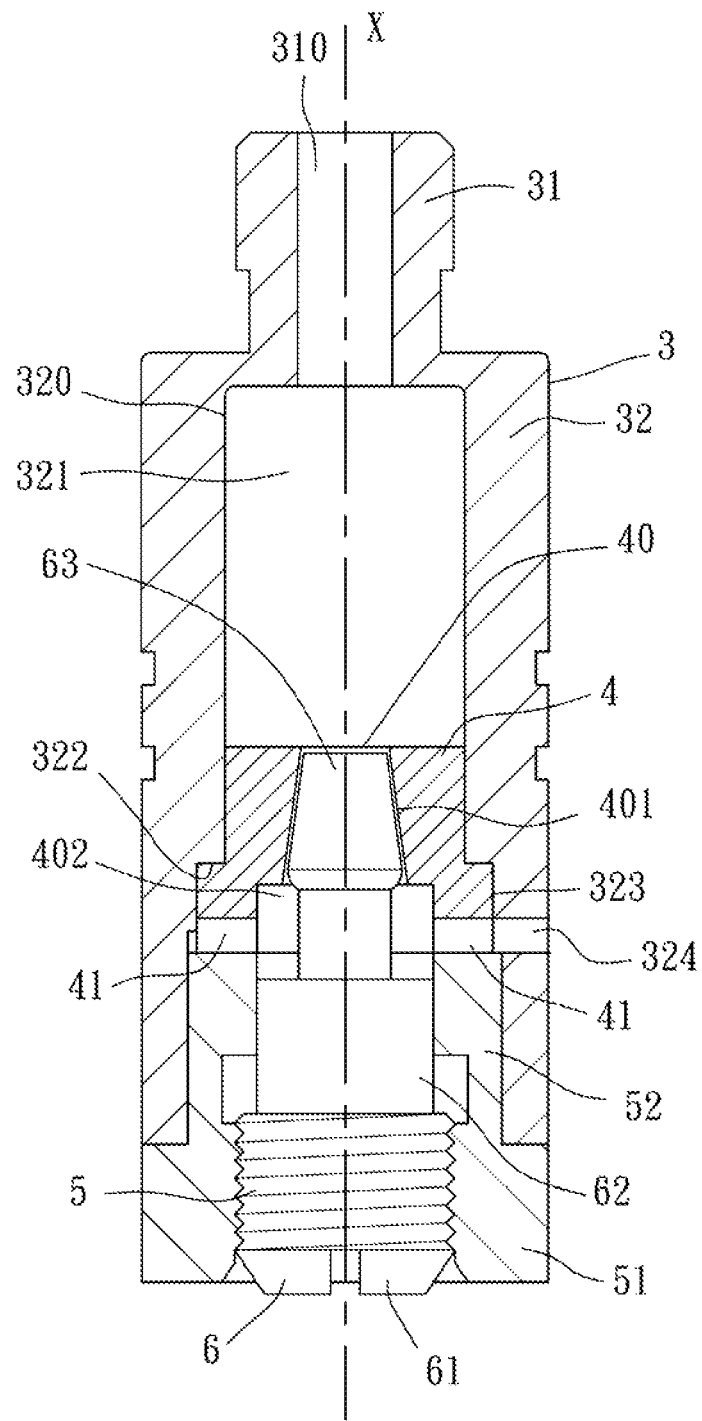
FIG. 3 is a sectional view illustrating assembly of a valve casing, a metal intermediate ring, a base ring, and an adjuster of the preferred embodiment.
Figure 4:
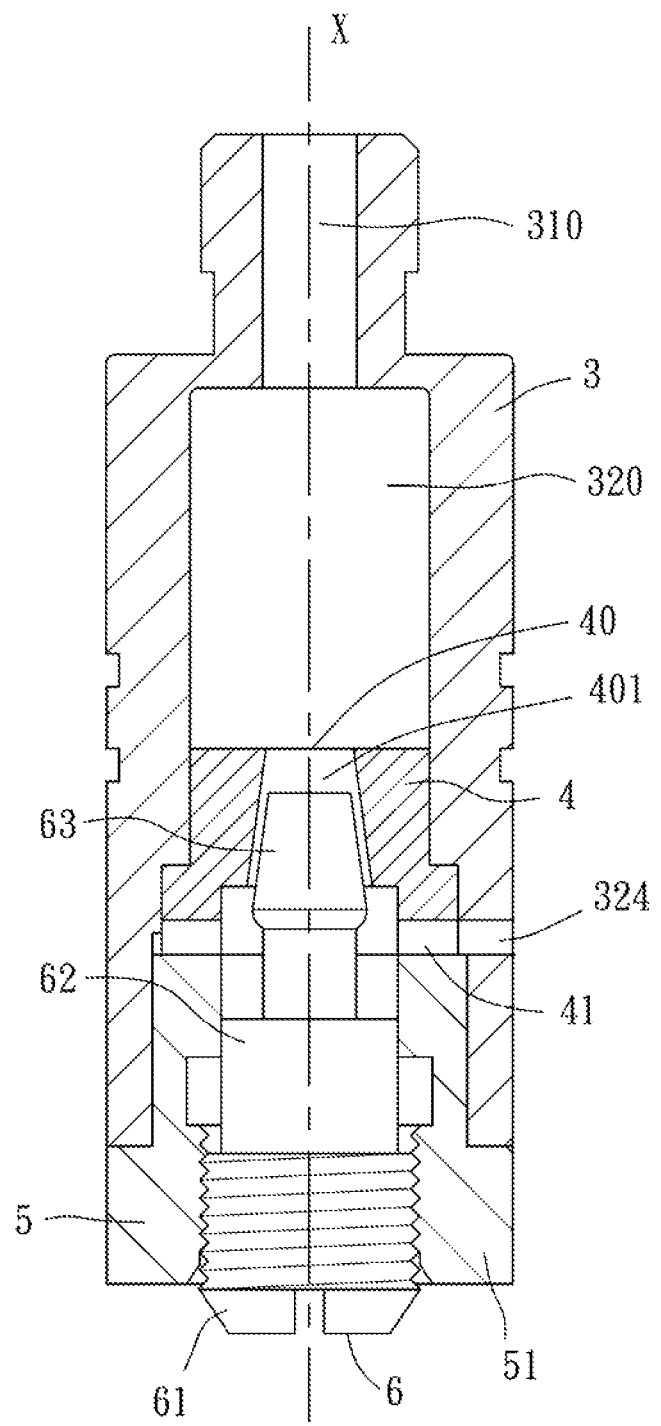
FIG. 4 is a sectional view showing movement of the adjuster relative to the base ring for opening a valve hole of the metal intermediate ring of the preferred embodiment.

Referring to FIGS. 2 to 4, the preferred embodiment of a discharge valve assembly according to the present invention is illustrated. The discharge valve assembly is adapted to be installed in an instrument that requires slow discharge of air, such as a sphygmomanometer or the like. The discharge valve assembly includes a valve casing 3, a metal intermediate ring 4 mounted coaxially in the valve casing 3, a base ring 5 mounted coaxially on a rear end of the valve casing 3, and an adjuster 6 inserted into the base ring 5 and the metal intermediate ring 4. In this embodiment, the valve casing 3 has a tubular shape, and the valve casing 3, the metal intermediate ring 4, the base ring 5, and the adjuster 6 are independently made of stainless steel. However, the present invention is not limited in this respect.

The valve casing 3 has an intake bore 310 that extends in a front-rear direction and along an axis (X) of the valve casing 3 and that opens frontward, an air chamber 320 communicating coaxially with the intake bore 310, and a discharge aperture 324 that extends radially and communicates with the air chamber 320. Preferably, the valve casing 3 further has a coupling section 31 that extends in the front-rear direction and defines the intake bore 310, and a main section 32 that extends coaxially and rearward from the coupling section 31, that has an outer diameter greater than that of the coupling section 31, and that defines the air chamber 320. The air chamber 320 has a small-diameter portion 321 communicating with the intake bore 310, a large-diameter portion 323 that has a hole diameter larger than that of the small-diameter portion 321 in the front-to-rear direction, and a shoulder portion 322 that interconnects the large-diameter and small-diameter portions 323, 321. In this embodiment, the discharge aperture 324 extends radially through the large-diameter portion 323 of the main section 32.

In this embodiment, the metal intermediate ring 4 is disposed coaxially in the air chamber 320. Preferably, the metal intermediate ring 4 is inserted into the large-diameter and small-diameter portions 323, 321 and abuts against the shoulder portion 322. In this embodiment, the metal intermediate ring 4 has a valve hole 40 that extends axially and communicates with the air chamber 320, and a plurality of connecting apertures 41 that extend radially and communicate with the discharge aperture 324 and the valve hole 40. Preferably, the metal intermediate ring 4 further has a valve section 401 that has the valve hole 40 with a hole diameter gradually enlarged in a front-to-rear direction, and a hollow connection section 402 that has as inner diameter greater than the hole diameter of the valve section 401, that communicates with the valve section 401 and the discharge aperture 324, and that has the connecting apertures 41. In this embodiment, the metal intermediate ring 4 has a thermal expansion coefficient ranging from $14.6 \times 10^{-6}/°$ C. to $17.5 \times 10^{-6}/°$ C.

In this embodiment, the base ring 5 has an annular retaining portion 52 that is extended frontward and inserted into the air chamber 320 and that abuts against a rear end of the metal intermediate ring 4 and retains the metal intermediate ring 4 in the air chamber 320, and a threaded portion 51 that extends frontward and abuts against the rear end of the valve casing 3.

The adjuster 6 is disposed coaxially in the base ring 5, extends frontward to be inserted into the valve hole 40, and is movable relative to the base ring 5 to adjust an air flow through the valve hole 40. The adjuster 6 has a valve head 63 that extends frontward, that is inserted into the valve hole 40, and that has an outer diameter gradually enlarged in the front-to-rear direction. Preferably, the threaded portion 51 of the bass ring 5 has a threaded inner surface. The adjuster 6 further has an adjusting portion 61 that is axially movable relative to and threadedly inserted into the threaded inner surface of the threaded portion 51, and a middle portion 62 that extends frontward from the adjusting portion 61 and connects to the valve head 63 and that is fitted in the retaining portion 52.

When the adjusting portion 61 is rotated to move frontward or rearward relative to the threaded portion 51, the middle portion 62 and the valve head 63 together move along the axle (X) relative to the metal intermediate ring 4 so as to affect an insertion state of the valve head 63 relative to the valve section 401. The insertion state of the valve head 63 is varied to adjust the air flow through an interspace between the valve head 63 and the valve section 401 of the metal intermediate ring 4, i.e., through the valve hole 40, the air flow is accurately adjustable to be discharged from, the air chamber 320 to the discharge aperture 324. In this embodiment, while a structure of the valve head 63 is designed to make the valve head 63 extend frontward and be fitted in the valve section 401, the valve head 63 does not completely and airtightly seal the valve section 401. When pressurized air is filled in the air chamber 320 through the intake bore 310, the air is able to be slowly discharged from the valve hole 40 to the discharge aperture 324 under any circumstance.

Accordingly, the discharge valve assembly of the present invention is adapted to be installed in an instrument for steadily controlling air pressure and discharging air flow. For example, the discharge valve assembly of the present invention may be installed in a sphygmomanometer. By virtue of rotation of the adjuster 6, the valve head 63 is axially controlled to vary the insertion state relative to valve section 401 of the metal intermediate ring 4 so as to control the air flow through the valve hole 40. Therefore, the air flow rate of the discharge valve assembly of the present invention is able to meet requirements of the sphygmomanometer in measurements of systolic blood pressure and diastolic blood pressure. Moreover, by virtue of the metal intermediate ring 4, the base ring 5, and the adjuster 6 being made from a metal, the discharge valve assembly of the present invention is able to avoid deformation due to elastic fatigue or changes in ambient temperature.

In this embodiment, the valve head 63 is configured in a frusto-conical shape complementary with that of the valve section 401 to control the air flow through the valve hole 40. In actual implementation, the valve head 63 and the valve section 402 may be configured to have other shapes, such as complementary ball contours. Aside from fitted abutment among the metal intermediate ring 4, the base ring 5, and the valve casing 3, the metal intermediate ring 4, the base ring 5, and the valve casing 3 may be threadedly secured to each other.

By virtue of the material and structural design of the metal intermediate ring 4, the base ring 5, and the valve casing 3, the discharge valve assembly of the present invention may not only avoid material fatigue encountered by the conventional discharge valve assembly, but also precisely control the air flow at a constant rate.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A discharge valve assembly comprising:
    a valve casing having an intake bore that extends in a front-rear direction and along an axis of said valve casing and that opens frontward, an air chamber communicating coaxially with said intake bore, and a discharge aperture that extends radially and communicates with said air chamber;
    a metal intermediate ring disposed coaxially in said air chamber, said intermediate ring having a valve hole that extends axially and communicates with said air chamber, and at least one connecting aperture that extends radially and communicates with said discharge aperture and said valve hole;
    a base ring that retains said metal intermediate ring in said air chamber, and that is coaxially mounted on said valve casing; and
    an adjuster disposed coaxially in said base ring, extending frontward to be inserted into said valve hole, and movable relative to said base ring to adjust an air flow through said valve hole;
    wherein said metal intermediate ring further has a valve section that has said valve hole with a hole diameter gradually enlarged in a front-to-rear direction, and a hollow connection section that has an inner diameter greater than said hole diameter of said valve section, that communicates with said valve section and that has said connecting aperture; and said adjuster has a valve head that extends frontward and is inserted into said valve hole and that has an outer diameter gradually enlarged in the front-to-rear direction; and
    wherein said base ring has an annular retaining portion that is extended frontward and inserted into said air chamber and that abuts against a rear end of said metal intermediate ring, and a threaded portion that extends frontward and abuts against a rear end of said valve casing, and adjuster further having an adjusting portion that is axially movable relative to and threadedly inserted into said threaded portion, and a middle portion that extends frontward from said adjusting portion and connects to said valve head and that is fitted in said retaining portion.

2. The discharge valve assembly as claimed in claim 1, wherein said valve casing further has a coupling section that extends in the front-rear direction and defines said intake bore, and a main section that extends coaxially and rearward from said coupling section, that has an outer diameter greater than that of said coupling section, and that defines said air chamber, said air chamber having a small-diameter portion communicating with said intake bore, a large-diameter portion having a hole diameter larger than that of said small-diameter portion in the front-to-rear direction, and a shoulder portion interconnecting said large-diameter and small-diameter portion, said metal intermediate ring being inserted into said large-diameter and small-diameter portions and abutting against said should portion.

3. The discharge valve assembly as claimed in claim 1, wherein said metal intermediate ring has a thermal expansion coefficient ranging from $14.6 \times 10^{-6}/°$ C. to $17.5 \times 10^{-6}/°$ C.

\* \* \* \* \*